(12) United States Patent
Kramer

(10) Patent No.: US 6,203,832 B1
(45) Date of Patent: Mar. 20, 2001

(54) METHOD FOR FORMING CASINGLESS SAUSAGES

(75) Inventor: Lee Kramer, Memphis, TN (US)

(73) Assignee: Sara Lee Corporation, Winston-Salem, NC (US)

( * ) Notice: Subject to any disclaimer, the term of this patent is extended or adjusted under 35 U.S.C. 154(b) by 0 days.

(21) Appl. No.: 09/159,416

(22) Filed: Sep. 23, 1998

Related U.S. Application Data

(63) Continuation-in-part of application No. 08/724,645, filed on Oct. 1, 1996, now abandoned.

(51) Int. Cl.⁷ ................................................. A23L 1/317
(52) U.S. Cl. ........................................ 426/276; 426/513
(58) Field of Search ..................................... 426/276, 513

(56) References Cited

U.S. PATENT DOCUMENTS

| | | | |
|---|---|---|---|
| 3,503,756 | * | 3/1970 | Wistreich .............................. 426/276 |
| 3,885,053 | * | 5/1975 | Townsend ............................. 426/276 |
| 4,636,393 | * | 1/1987 | Lynch et al. ......................... 426/276 |

\* cited by examiner

Primary Examiner—Arthur L. Corbin
(74) Attorney, Agent, or Firm—Kilpatrick Stockton LLP

(57) ABSTRACT

Method and apparatus for forming batter into casingless sausages and similar meat products in which an extrudable meat emulsion is simultaneously formed in a generally cylindrical configuration with a cohesive surface from a denaturing solution at a temperature of from ambient temperature to 170° F. The cylindrically formed emulsion is then separated into segments having first and second ends and a defined length, and the formed segments are thereafter introduced to a cooking apparatus. The apparatus for forming the casingless sausages includes extrusion/denaturing application apparatus, cylindrically shaping, sizing, and skin forming apparatus, and an end clamp. Another embodiment includes a heat exchanger to further assist the formation of a skin like surface on the meat product and shorten the cooking time.

5 Claims, 4 Drawing Sheets

METHOD FOR FORMING CASINGLESS SAUSAGES

This is a continuation-in-part application of application Ser. No. 08/724,645 filed Oct. 1, 1996, now abandoned.

BACKGROUND OF THE INVENTION

1. Field of the Invention

The present invention relates to a method and apparatus for the production of molded meat or meat-like products and more particularly for forming casingless sausages and the like.

2. Description of the Prior Art

In the preparation of meat products such as sausages and the like, it is desirable to keep costs as low as possible. For this reason, skinless products such as sausages and wieners may be preferred to sausages with skins since the cost of applying an edible skin to a sausage can amount to a substantial part of the total manufacturing cost. By "skinless" is meant a product free from an external supporting membrane of collagen or natural gut.

A conventional method of producing skinless products involves the use of a permeable cellulose casing which may be inedible, or at least unacceptable for consumption. This is filled with a meat paste, formed into lengths, and thereafter heat processed to form a heat coagulated protein skin. The meat lengths are then cooled after which the cellulose casing is removed. See, for example, U.S. Pat. No. 4,414,707.

Various devices have been proposed for forming and processing sausages and the like without using casings. For example, a formed food batter or emulsion can be shaped and cooked within an elongated tube utilizing end shaping plugs such as shown in U.S. Pat. No. 4,113,890. This requires a continuous inserting of the batter and plugs into the tube and the subsequent removal thereof thus involving tedious manual labor.

Another method of preparing a skinless product without the use of casing is to treat the surface of such product after it has been shaped with a suitable fluid, for example, an edible acid which reacts with protein and precipitates to form a cohesive surface for the sausage paste. U.S. Pat. No. 3,503,756 discloses a process in which a meat emulsion is extruded, and then treated in an acid bath, either before or after cutting into suitable lengths for frankfurters and the like. The treating of the extruded meat does, however, present handling difficulties.

Other suggestions in the art are shown in patents that call for shaping of a batter-like product within a tube or mold and thereafter removing the finally shaped product from the mold. These techniques require complicated apparatus and often include a complex molding structure having various moving parts and multiple components which, at times, must be accurately indexed and aligned with respect to each other.

While there have been numerous attempts to economically and efficiently produce and market casingless sausages and the like, there are still difficulties associated with multiple handlings of the product that need to be refined and ideally eliminated. It is to these improved objectives that the present invention is directed.

SUMMARY OF THE INVENTION

The method of the present invention for forming casingless sausage-like products encompasses the simultaneous treatment of an extrudable meat emulsion to form a generally cylindrical configuration and a cohesive surface with a denaturing solution. The extruded skin-formed emulsion is then shaped into segments or links of defined length and thereafter introduced into an appropriate cooking apparatus.

The apparatus of the present invention for forming casingless sausages and the like includes an extrusion means, a cylindrically shaping and skin-forming station receiving the continuous extrusion, segment-forming apparatus to separate the continuous material into segments of defined length, and cooking means for cooking the formed segments.

In an alternative embodiment, a heat exchanger is placed in the extrusion line so that a higher than ambient temperature is applied to the continuous extrusion to enhance the texture of the surface area to more closely resemble a skin and to shorten the cooking time. Thus, the extrusion when formed into segments has a firmer outer surface before being introduced to the cooking apparatus.

A hose end clamp may also be used with either embodiment to vary the diameter of the extruded material for whatever application is needed.

The method and apparatus of the invention provides substantial savings in cost and labor by eliminating the need for casings and the equipment typically associated with the use of such materials.

From the foregoing summary of the invention, it can be seen that an objective of the present invention is to provide a method for transforming batter into shaped products without utilizing casings and the intricate equipment normally associated with such a method.

Another objective of the present invention is to provide an improved apparatus for making sausage and the like that does not require the use of casing removal equipment.

Thus, there has been outlined, in summary form, the more important features of the invention in order that the detailed description that follows may be better understood and in order that the present contribution to the art may be better appreciated. There are, obviously, additional features of the invention that will be described hereinafter and which will form the subject matter of the claims appended hereto. It is to be understood that the invention is not limited in its application to the details of construction and to the arrangement of the components set forth in the following description or illustrated in the drawings. The invention is capable of other embodiments and of being practiced and carried out in various ways.

It is also to be understood that the phraseology and terminology herein are for the purpose of description and should not be regarded as limited in any respect. Those skilled in the art will appreciate the concept upon which this disclosure is based and that it may readily be utilized as a basis for designing other structures, methods and systems for carrying out the several purposes of the invention. It is also to be understood that the abstract is neither intended to define the invention or the application which is measured by the claims nor to limit its scope in any way. This summary and these objectives of the invention, along with the various features of novelty which characterize the invention, are pointed out with particularity in the claims annexed to and a part of this disclosure. For a better understanding of the invention, its operating advantages and the specific objectives obtained by its use, reference should be made to the accompanying drawings and descriptive matter in which like characters of reference designate like parts throughout the several views.

BRIEF DESCRIPTION OF THE DRAWINGS

In the description of the present invention, reference will be made to the attached drawings wherein.

DETAILED DESCRIPTION OF THE PREFERRED EMBODIMENT

Figure 1:
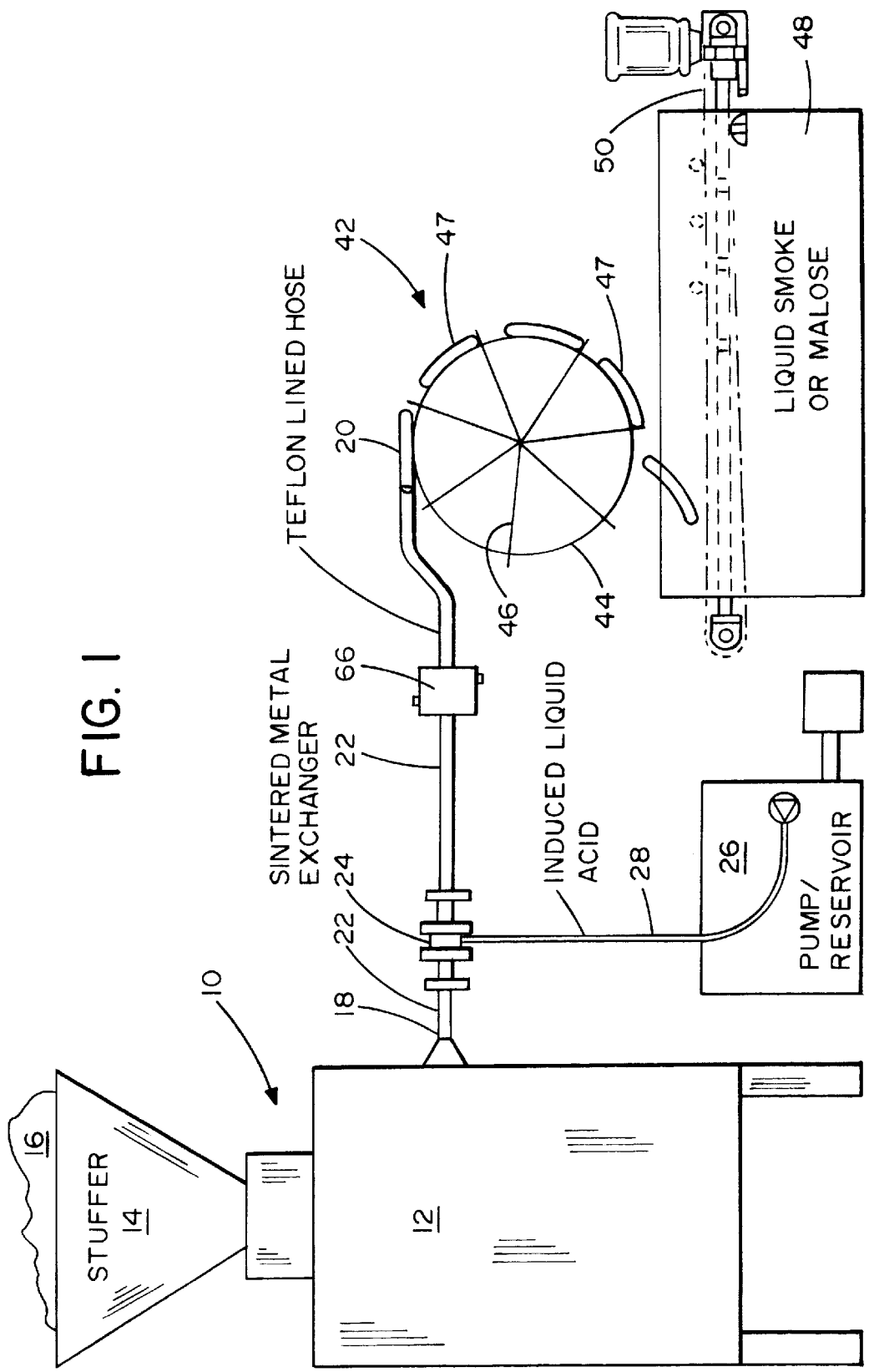
FIG. 1 is a side elevational view, in schematic, of one embodiment of the present invention.

Referring now to the drawings and particularly to FIG. 1, an extrusion assembly shown generally as 10 includes a batter holding bin 12, a stuffer 14 through which batter material 16 is introduced to holding bin 12, and an extruder 18 connecting with holding bin 12 through which batter material 16 is extruded to form ultimately a cylindrically configured extrusion 20. Extrusion 20 is formed within a Teflon-lined hose 22 and is introduced into a sintered metal exchanger shown generally as 24.

Figure 2:
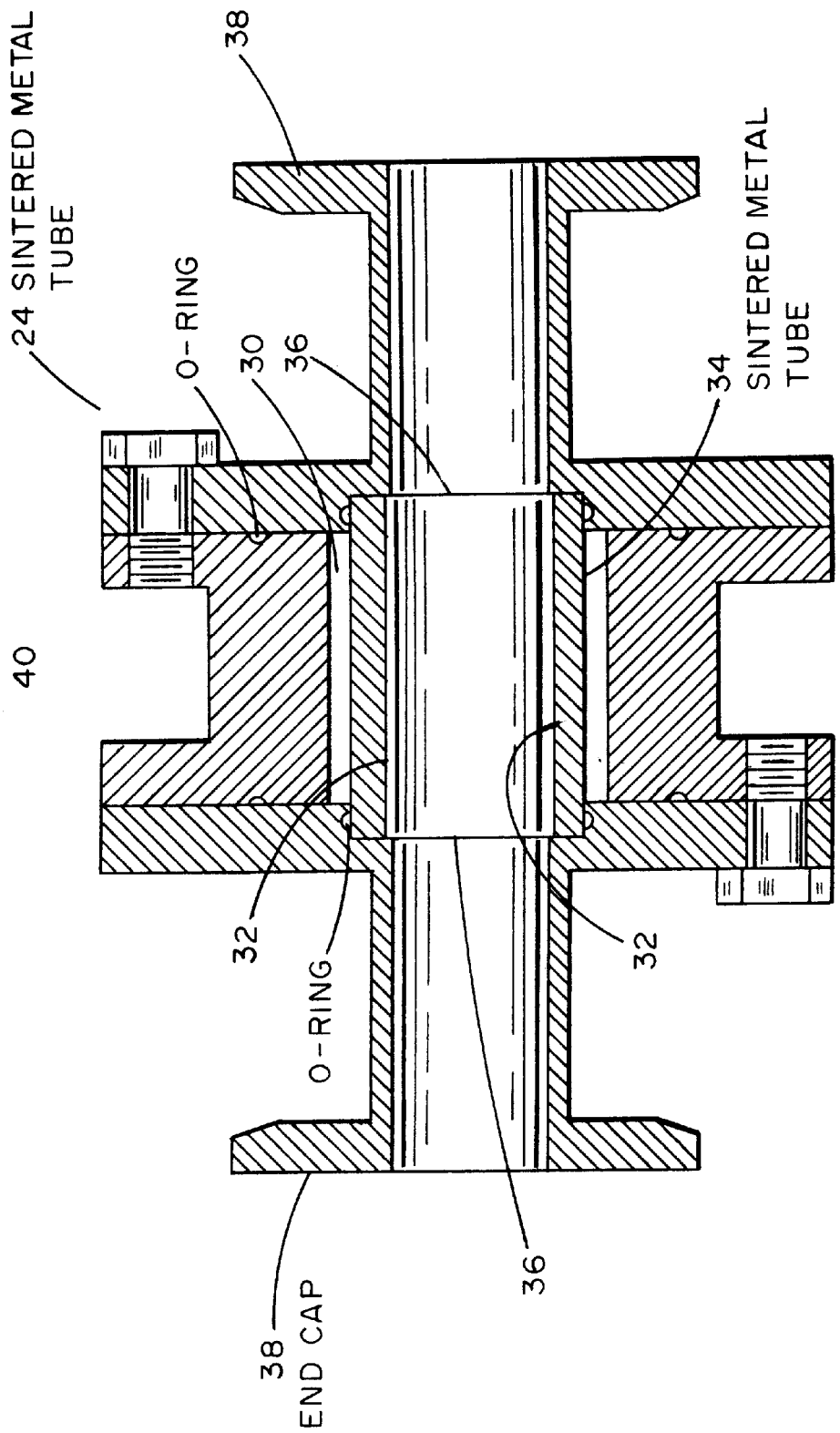
FIG. 2 is an enlarged, side elevational, sectional view of the skin-forming apparatus which receives the configured extrusion.

Sintered metal exchanger 24 is used to form a cavity with a permeable wall through which is introduced a fluid for treating the surface of a product. Such devices are shown in detail in U.S. Pat. Nos. 4,280,803 and 4,404,229, the contents of which are incorporated herein by reference. In the present invention, a denaturing solution including, for example, water and acetic acid, is pumped from a reservoir 26 through a connecting line 28 into cavity 30 of sinter assembly 24 and thereafter passes through the permeable wall 32 of sintered metal tube 34 as shown in FIG. 2. Other solutions may effectively be used so long as an edible acid such as defined in U.S. Pat. No. 4,404,229 is used in connection with the foodstuffs and does not result in the production of inedible products. Such acids includes organic acids, e.g., acetic acid, malic acid, ascorbic acid and citric acids and inorganic acids, e.g., hydrochloric acid and phosphoric acid. The acid may generally be employed in the form of a simple aqueous solution with a pH of between 1.0 and 3.0, e.g., dependent on the availability of soluble protein content for precipitation—the higher the content, the higher the numerical value of the pH. For example, a denaturing solution may be used with about 90% acetic acid and about 2% water by volume.

Sintered metal tube 34 has two open ends 36 with end caps 38 connecting with each. A circularly configured metal exchanger 40 encircles and cooperatively engages sintered metal tube 34 to provide cavity 30 for receiving the denaturing solution. As the denaturing solution is applied to the surface of the simultaneously extruded and cylindrically formed emulsion, it reacts with the protein of the meat to provide a cohesive surface or skin.

As the extruded cylindrical material passes from the sintered metal exchanger 24 through Teflon-lined hose 22, it ultimately engages a circular cutter shown generally in FIG. 1 as 42. Cutter 42 includes a flywheel 44 on which is mounted a plurality of cutting blades 46 which systematically engage the extruded tubular emulsion 20 at predetermined locations to sever emulsion 20 and thereby form individual lengths 47. As flywheel 44 continues to rotate, the formed lengths 47 fall freely into a cooktank or cool method tank 48 depending on the operation intended to be carried out. For example, hot water or steam may be used to heat the surface of the product and form a heat coagulated cohesive surface or length may be moved directly to a cooker where cooking takes place within a temperature range of from 180° F. to 210° F.

In an alternative embodiment, a heat exchanger shown generally as 66 is inserted in Teflon-lined hose 22 so that the temperature of the extrusion therein can be elevated from ambient temperature up to a temperature of about 140 F. to 180° F. to form an extrusion having a more dense surface to provide firmer retention of its shape. The device also reduces the cooking time to some degree thus shortening the overall time for the extrusion formation and cooking.

A hose end clamp shown generally as 68 has an adjustability feature that provides for extrusions of different diameters as conditions require.

A conveying apparatus 50 extends within tank 48 and moves the collected lengths 47 through the fluid to a remote location for subsequent handling. Lengths 47 may be subsequently cooked and packed or they may be stored in the removed condition for subsequent packaging prior to cooking.

Figure 3:
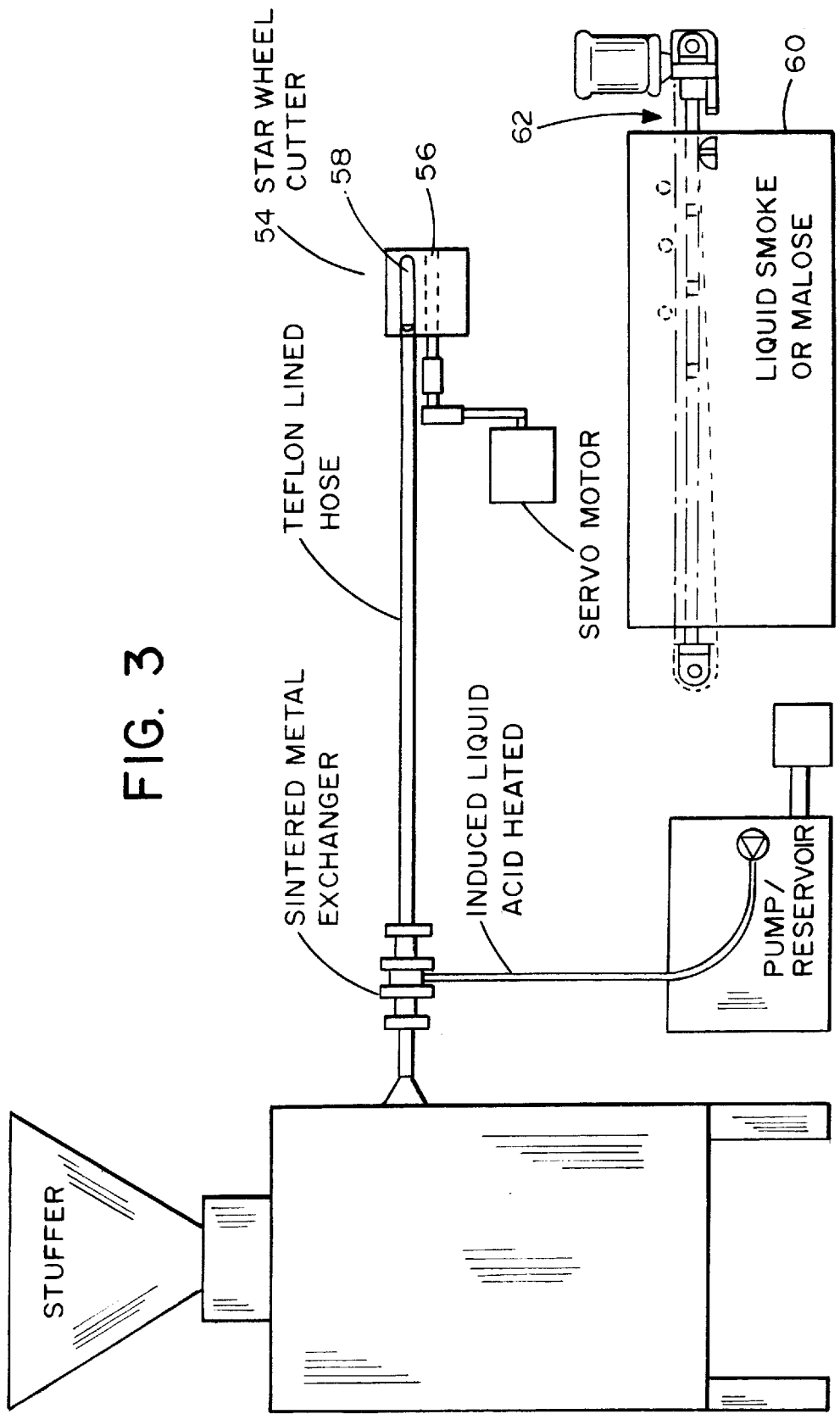
FIG. 3 is a side elevational view, in schematic, of another embodiment of the present invention.
Figure 4:
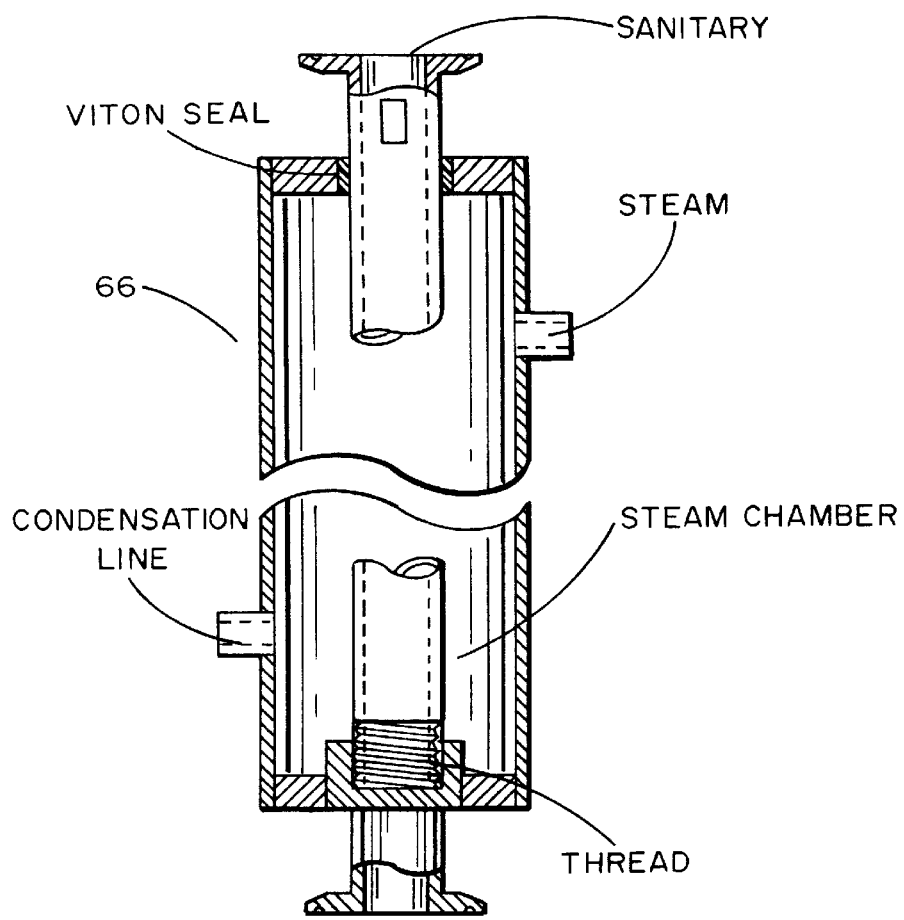
FIG. 4 is a side elevational sectional view of the heat exchanger that can be positioned in the Teflon-lined hose to raise the temperature of the extrusion.
Figure 5:
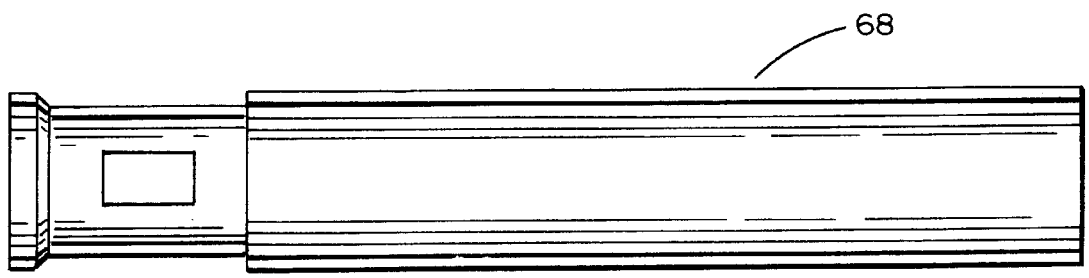
FIG. 5 is a side elevational view of the hose end clamp connected to the Teflon-lined hose for varying the size of the extruded material.

An alternative embodiment of a link-forming apparatus is shown generally in FIG. 3 as 54. A star wheel cutter 56 is mounted parallel to the cylindrically extruded configuration and rotates so that it captures a link 58 within one trough and severs it from the continuous length. Star wheel cutter 56 rotates continuously and thus receives and forms a link in each trough as it engages the cylindrically shaped configuration.

Again, the formed lengths 58 fall into a receptacle 60 containing another conditioning fluid and are subsequently moved through and removed by a conveying apparatus 62 as previously discussed. The removed and treated sausage-like material can be cooked and packaged or packaged directly for subsequent cooking as desired.

The method and apparatus comprising the present invention can be used to make any variety of linkage like food products, particularly frankfurters and sausages. The cutting devices associated with the apparatus can be configured to provide linkages of varying or unvarying lengths, depending on the blade setting of each cutter.

In cooking products of the type contemplated by the present invention, the mere application of heat to the product will cause voids in the surface, giving an imperfect product due to the presence of fat particles on the surface which melt. In the present apparatus, however, the pressure exerted to force the emulsion into the sintered tube causes the voids to be filled by the emulsion or mixed particles and thus a smooth, even coagulated surface is provided. Thus, when the product is cooked, it retains a skinlike texture even though there is no foreign skin. The product is self-sustaining and ready for further cooking, smoking or other processing.

The present invention has been shown and described herein in what is considered the most practical and preferred embodiment. It is recognized, however, that departure may be made therefrom within the scope of the invention. The invention is therefore not to be limited to the details disclosed herein but to be accorded a full scope of the claims so as to embrace any and all equivalent apparatus and methods.

What is claimed is:

1. A method of forming a casingless sausage shaped meat product comprising the steps of:

introducing a flowable meat emulsion into an extruder under pressure to move the emulsion therethrough while simultaneously applying a denaturing solution to form a cohesive surface on the extruder held emulsion at a temperature of from ambient temperature to about 170° F.;

extruding the meat emulsion in a tubular configuration;

preliminarily heating the extruded emulsion at a temperature from 140° F. to 180° F. in the extruder;

forming the extruded and heated meat emulsion into segments, each segment having first and second ends and a defined length; and introducing the formed segments into a cooking device at a temperature from 180° Fahrenheit to 210° Fahrenheit.

2. The method as claimed in claim 1 wherein the denaturing solution includes from 1% to 5% water and 80% to 97% acetic acid of total volume.

3. The method as claimed in claim 2 further comprising cooking the next segments.

4. The method as claimed in claim 1 further comprising cooking the next segments.

5. A method of forming a casingless tubular shaped meat product comprising the steps of:

introducing a flowable meat emulsion into a tubular configured extruder under pressure to move the emulsion therethrough while simultaneously applying a denaturing solution to form a cohesive surface on the extruder held emulsion;

extruding the meat emulsion in a generally cylindrical configuration consistent with the tubular configured extruder at a temperature of from ambient to about 170° Fahrenheit;

preliminarily heating the extruded emulsion at a temperature from 140° F. to 180° F. in the extruder;

forming the extruded and heated meat emulsion into segments, each segment having first and second ends and a defined length; and introducing the formed segments into a cooking device at a temperature of from 180° Fahrenheit to 210° Fahrenheit thereby cooking the cohesively surfaced meat emulsion segments.

* * * * *